United States Patent
Schwerk

(10) Patent No.: US 7,580,993 B2
(45) Date of Patent: Aug. 25, 2009

(54) DOCUMENT BROADCASTING UTILIZING HASHCODES

(75) Inventor: Uwe Schwerk, Heidelberg (DE)

(73) Assignee: SAP AG, Walldorf (DE)

( * ) Notice: Subject to any disclaimer, the term of this patent is extended or adjusted under 35 U.S.C. 154(b) by 755 days.

(21) Appl. No.: 10/902,997

(22) Filed: Jul. 30, 2004

(65) Prior Publication Data

US 2006/0036684 A1 Feb. 16, 2006

(51) Int. Cl.
*G06F 15/173* (2006.01)
(52) U.S. Cl. .................. 709/223; 709/203; 709/217; 707/10; 707/200
(58) Field of Classification Search ............. 709/223, 709/203, 217; 707/10, 101, 200, 202, 205
See application file for complete search history.

(56) References Cited

U.S. PATENT DOCUMENTS

| | | | | |
|---|---|---|---|---|
| 6,405,239 B1 * | 6/2002 | Addington et al. | ........... | 709/203 |
| 6,417,934 B1 * | 7/2002 | Sadr-Salek | ................... | 358/442 |
| 6,547,829 B1 * | 4/2003 | Meyerzon et al. | ........ | 715/501.1 |
| 6,638,314 B1 * | 10/2003 | Meyerzon et al. | ........... | 715/513 |
| 6,658,423 B1 * | 12/2003 | Pugh et al. | ................... | 707/102 |
| 2004/0068664 A1 * | 4/2004 | Nachenberg et al. | ........ | 713/200 |
| 2006/0064394 A1 * | 3/2006 | Dettinger et al. | ............... | 707/1 |

OTHER PUBLICATIONS

Ertel, Wolfgang, *Angewandte Kryptographie*, Carl Hanser Verlag Munchen Wien, 2003.

* cited by examiner

*Primary Examiner*—Lashonda T Jacobs
(74) *Attorney, Agent, or Firm*—Mintz, Levin, Cohn, Ferris, Glovsky & Popeo, P.C.

(57) ABSTRACT

In a business environment, a document with data can be distributed to one or more receivers on a regular basis. Between distribution intervals, the document may or may not be updated with different data. In one implementation, a document distribution system includes a hashcode generator for a document. The hashcode generator can generate a hashcode that is unique for the document. The system includes a comparator to compare a hashcode for a previously-distributed document with the hashcode generated for the document. The system can have one or more distribution channels to distribute the document. Executable information can include instructions to distribute the document over the one or more distribution channels if the comparator determines that the hashcode for the previously-distributed document and the hashcode generated for the document are different.

25 Claims, 3 Drawing Sheets

DOCUMENT BROADCASTING UTILIZING HASHCODES

BACKGROUND

The following description relates to methods and techniques of distributing broadcast content.

Documents may be broadcast to one or more receivers on a regular basis. Broadcasting may include sending documents in email, sending alerts or notices that documents are available from a distribution source, and faxing documents. The documents are typically scheduled for regular distribution to the one or more receivers through one or more electronic distribution channels. The receivers may include subscribers to a subscription service, such as email, where subscribers receive the latest data and updates for products, research, and markets. The receivers may include managers and project planners who receive status reports, spreadsheets, and research data for one or more business goals, and may be within or outside a distributing party's organization.

The distribution schedule for the documents may include daily, weekly, monthly, and quarterly distribution of reports. Generally, the same document is distributed. However, the data or content within the document may be updated with more recent data. Even though the data may be updated with data that is more recent than the last document that was broadcasted, the updated data may not be added or different data. If the updated data is not new, the receiver can get essentially the same document that was sent in the last reporting period. The receiver may spend their time and efforts searching for new data that is not in the received document. Also, if large documents are sent to multiple receivers at the same time, the large documents may increase network traffic and reduce the transmission rate of other communications on the distribution channels and/or network system.

In another aspect, the document may have the same data, but may have a different template and/or format. If the receiver is primarily concerned with receiving new data in the document, the document may not need to be distributed at the next distribution interval, even though the formatting of the data is different.

A technique of determining whether the document being sent contains data that is additional or different from the previously-distributed document is to compare the previously-distributed document with the document that is currently being prepared to be distributed. The technique may include the storing of both the previously-distributed document and the document updated with new data on the distribution system. The documents that are reported tend to be large in size. The storing of one or both of the documents can consume system resources, and a comparison of the content of those large documents may be a time-consuming task.

SUMMARY

In one implementation, the present disclosure relates to a system for scheduled distribution of regularly-updated documents that includes a hashcode generator to generate a unique hashcode for a document (and/or data in the document.) The hashcode generator generates a hashcode for the document (and/or data in the document) that is different from a hashcode for a previously-distributed document (and/or data in the previously-distributed document) if the document (and/or data in the document) includes an addition and/or change from the previously-distributed document (and/or data in the previously-distributed document). The system includes a comparator to compare the hashcode generated for the document (and/or data in the document) with a hashcode for a previously-distributed document (and/or data in the previously-distributed document), and distribution channels to distribute the document. The system also includes executable information with instructions to distribute the document over the distribution channels if the comparator determines that the hashcode generated for the document (and/or data in the document) and the hashcode for the previously-distributed document (and/or data in the previously-distributed document) are different.

The system may include a broadcast engine to distribute the document to receivers over the distribution channels. The system may also include broadcast settings with user-defined settings for the receivers. The user-defined settings may include variables to use in a document template, such as a page layout variable. The user-defined settings may also include parameters to specify how a receiver prefers to receive the document, and user settings for data types included in the document and document template. The executable information may include instructions to distribute the document to the receivers if the hashcode for the previously-distributed document and the hashcode generated for the document are different. The executable information may include instructions to not distribute the document to the one or more receivers if the hashcode for the previously-distributed document and the hashcode generated for the document are not different. The executable information may also include instructions to send an alert to notify the receivers if the hashcode for the previously-distributed document and the hashcode generated for the document are different.

The current disclosure also describes a computer program product that includes instructions to cause a data processing apparatus to upload data in a document. The document can be distributed at scheduled intervals. The instructions cause the data processing apparatus to generate a hashcode for the document and/or data, distribute the document, and at the next scheduled interval, update the document by uploading the document with updated data. A hashcode is generated for the updated document and/or updated data, and comparison is made for the hashcode for the document that was distributed and/or the data with the hashcode for the updated document and/or the updated data. The instructions also cause the data processing apparatus to determine whether to distribute the updated document based on the comparison.

Also described is an apparatus that involves a computer-readable storage medium tangibly embodying program instructions for distributing a document. The program instructions include instructions to cause a computer to define a hashcode for the document (and/or data in the document), distribute the document over one or more distribution channels, and update the document with new data at a later scheduled interval. The program instructions also include instructions to cause a computer to define a hashcode for the updated document (and/or the new data), and compare the hashcode for the updated document (and/or the new data) and the hashcode with the distributed document (and/or the data) to determine if the hashcodes differ. If the hashcodes differ, instructions are included to determine that the updated document and the distributed document are different. The hashcodes for the document, the data in the document, the updated document, and/or the new data in the updated document are uniquely defined.

The systems and techniques described here may provide one or more of the following advantages. For example, less storage space can be used when a current hashcode of a current document with updated data is compared to a hashcode of a previously-broadcasted document. The current document and the previously-broadcasted document may be large in file size, and typically require larger amounts of storage space than the hashcodes of the respective documents. In another advantage, a reduction in traffic for one or more distribution channels may occur because current documents with updated data may not be distributed if the updated data is not additional or different data than what was sent in the previously-broadcasted document. One or more persons who receive regularly scheduled broadcasted documents can reduce an amount of time and effort that they have to spend by not reading and searching through documents that have little or no new data.

The details of one or more implementations are set forth in the accompanying drawings and the description below. Other features and advantages will be apparent from the description and drawings, and from the claims.

DRAWING DESCRIPTIONS

Like reference symbols in the various drawings may indicate like elements.

DETAILED DESCRIPTION

Figure 1:
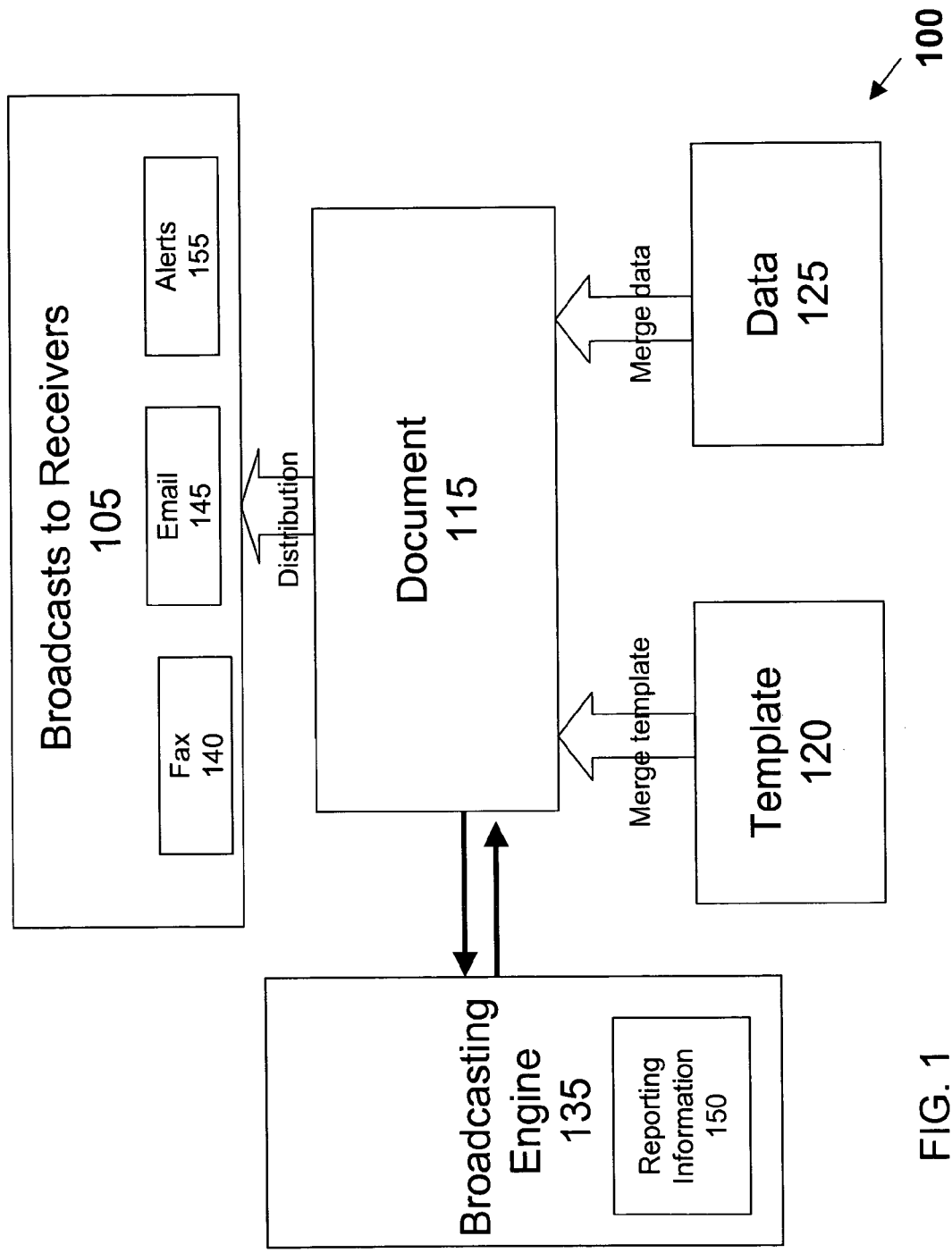
FIG. 1 is an exemplary block diagram of a document broadcasting system.

The following detailed description makes reference to the accompanying drawings. Other embodiments of the present invention are possible and modifications may be made to the embodiments without departing from the spirit and scope of the invention. Therefore, the following detailed description is not meant to limit the invention.

Moreover, for convenience in the ensuing description, some explanations of terms are provided herein. However, the explanations contained herein are intended to be exemplary only. They are not intended to limit the terms as they are described or referred to throughout the specification. Rather these explanations are meant to include any additional aspects and/or examples of the terms as described and claimed herein and/or as used by one of skill in the art.

The present disclosure describes systems, methods, and techniques in which hashcodes are used when distributing regularly scheduled documents for broadcasting to one or more receivers. The distribution schedule for the documents may include daily, weekly, monthly, and quarterly distribution of reports or any other types of distribution schedules. The schedules for distributing the documents may be determined by the distributing party and/or by the receiver. Accordingly, the "broadcasting" of a document is not limited to broadcasting to multiple receivers at the same time, but also to individual receivers at an interval specified by the receiver. For instance, the distributing party may generally broadcast documents on a monthly basis by default. However, the receiver may specify to receive a document every Wednesday.

Generally, the same document is distributed on a regular basis. However, the data in the document may be updated with more recent data which may or may not include additional or different data.

The present disclosure describes techniques, methods, and systems in which a fingerprint of the documents are generated and used when comparing documents between regularly scheduled intervals to determine if the documents differ. The fingerprints of the document include identifying characteristics of the document, such as an electronic tag, and can be represented by a hashcode. The hashcode may be an alphanumeric representation of the fingerprint of the document, such as a 40-character key. The fingerprint can be based on the content of data of the document or the complete document, such as the content of the data of the document, document metadata, document formatting, and the like.

When a document is distributed, a fingerprint of the document can be stored on the distributing system. When the document is updated with recent data at the next scheduled interval, the fingerprint of the document can be taken prior to distributing out the document. If the fingerprint of the previously-distributed document and the fingerprint of the updated document are the same, the distribution system may not distribute the document at the scheduled interval because the document has not changed from the last interval. If the fingerprint of the previously-distributed data differs from the fingerprint of the current data, the distributing system may not distribute the document. In one implementation, the distribution system can select to not distribute documents if the fingerprints have not changed. In another implementation, a receiver can inform the distribution system to not send documents if there is no new data.

Hashcodes tend to be uniquely-defined for each document, and can present a way of computing a small numeric key from a long string or even an arbitrary clump of bytes. When the hashcodes are stored on the distribution system, the hashcodes can use less storage resources than storing entire documents. When performing comparisons to detect changes, the hashcodes may also require less time and system resources because the hashcodes are compared rather than the documents themselves.

In another implementation, at the next schedule distribution interval, the distribution system can update the data in the document and distribute the updated document and/or the updated document's hashcode to the receiver. The receiver's system can compare the hashcodes to determine if the updated document contains any additional or different data. If the hashcodes are the same, the receiving system can notify the receiver that there is no new information in the document. Alternatively, the receiving system can compare the hashcodes and if there is no new information in the document then the receiving system may not inform the receiver that there is no new information in the document.

FIG. 1 is an exemplary block diagram of a document broadcasting system 100. The document 115 being distributed may typically include a template 120 for formatting the data. The template 120 may be merged into one or more document properties and may include document specifications for fonts, colors, page layouts, palettes, styles, graphic figures, and the like. The document 115 may also be loaded with data 125. The data may be generated from a data source (not shown), and may include most recent information for the reports, such as financial data, employee data, or other project data. The data may be typically merged into the document—i.e., new data can be added to the document and the existing data in the document may be replaced. The template 120 may rarely change from one scheduled reporting interval to the next. The data 125 may change for each reporting interval.

The document broadcasting system 100 includes a broadcasting engine 135 which is designed to provide reporting information 150 to one or more receivers. The reporting information 150 can include a list of receivers and reporting specifications, such as what type of reporting document should be distributed, when the reporting document should be distributed, and how the reporting document should be distributed. The document 115 can be distributed by email 145, or by sending an alert 155 to the receiver that a document 115 is available for downloading or fetching from the document broadcasting system 100. The document 115 may also be faxed to the receiving system based on the receiver's specifications. The document may be broadcasted 105 to multiple receivers at a regular reporting interval or the document can be sent to one or more receivers depending on each receiver's respective distribution specifications.

Before the document 115 is broadcasted, a hashcode is created for the document 115. To check for changes in the document 115 between intervals, the hashcode of the document being sent is compared with the hashcode of the most recent document that was sent to the receiver. In one implementation, the receiver has the option to determine whether they select to receive the document 115 if there are no changes to the document 115. For example, the receiver may select to receive the document 115 even though the document has no changes from the previous document that was sent. The receiver may select to receive an alert 155 to inform the receiver that they can receive the document for a current distribution interval, and that the document has no new information from the last document that they received. The receiver may also select to not be notified at all if the document has no additional or different data. In this case, the receiver receives no email 145 with the document or no alerts 155 informing them that another document is available for distribution.

Alternatively, the receiver may also be interested in only the data within the document. In this case, even though the document may have changed, the document may not be distributed to the receiver because the data did not change from the last distributed document. In one example, the document may have changed due to different formatting instructions in the template 120.

Figure 2:
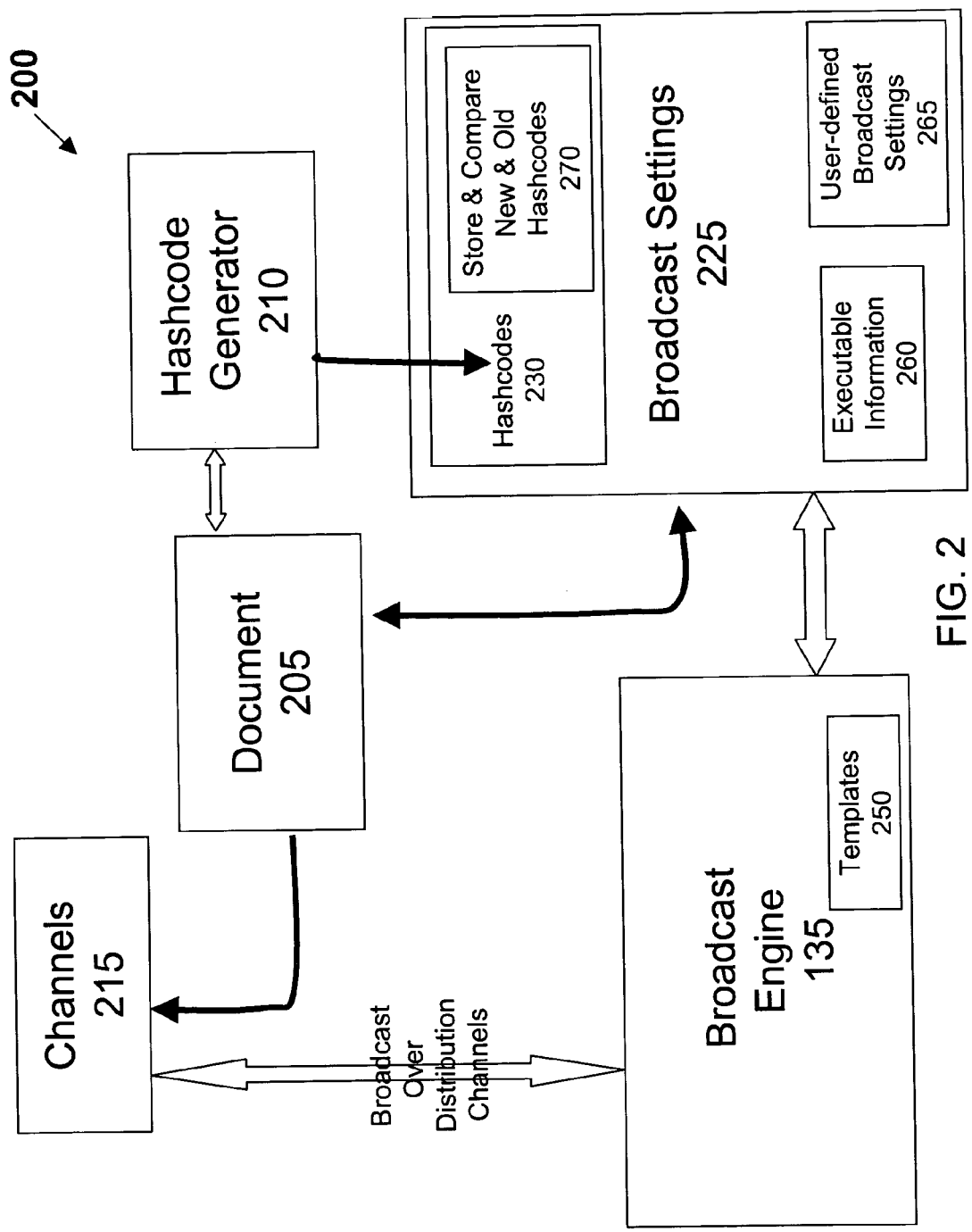
FIG. 2 is an exemplary block diagram of a document broadcasting system.

FIG. 2 shows another exemplary block diagram of a document broadcasting system 200. A document 205 containing data can be regularly distributed over one or more distribution channels 215 for a document distribution schedule. Before the document 205 is distributed, a hashcode generator 210 can produce a hashcode for the document 205. The hashcode generator 210 may also produce a hashcode for the data in document 205. The hashcodes are stored with the broadcast settings 225 of the system 200. The system 200 includes a memory which stores which documents 205 are sent to one or more receivers. Storing the hashcodes of the current document and the hashcodes of the most-recently distributed document reduces storage resource usage compared to storing both versions of the document. Hashcodes may be generated in a number of methods, such as having a software module to generate a hashcode for an input string or document. Hashcodes are used when determining whether there are changes in successive versions of a document being distributed on a regular distribution schedule.

The broadcast settings 225 include one or more parameters that are saved and/or utilized when generating a document and hashcode, and when distributing the document over one or more channels 215. For example, the broadcast settings can include user-defined broadcast settings 265. The user-defined broadcast settings 265 may include one or more specifications of how and when a receiver prefers to receive the document 205. The receiver can also specify what type of data should be included in the document 205, the template that should be used, and any variables in the template, such as a page layout variable.

The broadcast settings 225 also include executable information 260. The hashcodes of the current document and the previously sent document can be stored and compared (block 270). In one implementation after a document is distributed to one or more receivers, the newly-distributed document's hashcode can replace the hashcode of the document that was previously distributed.

The system 200 includes a broadcast engine 135 that may perform one or more of the tasks described in regards to FIG. 1. The broadcast engine 135 broadcasts the document 205 over one or more distribution channels. One or more templates 250 are associated with the broadcast engine 135. For example, a broadcast engine can select a template for a receiver based on one or more broadcast settings 225. However, the templates 250 and/or the data are not necessarily limited to be used with a broadcast engine 135 as shown in FIG. 2. The templates and/or the data can be created and selected independently of the broadcast engine 135.

Figure 3:
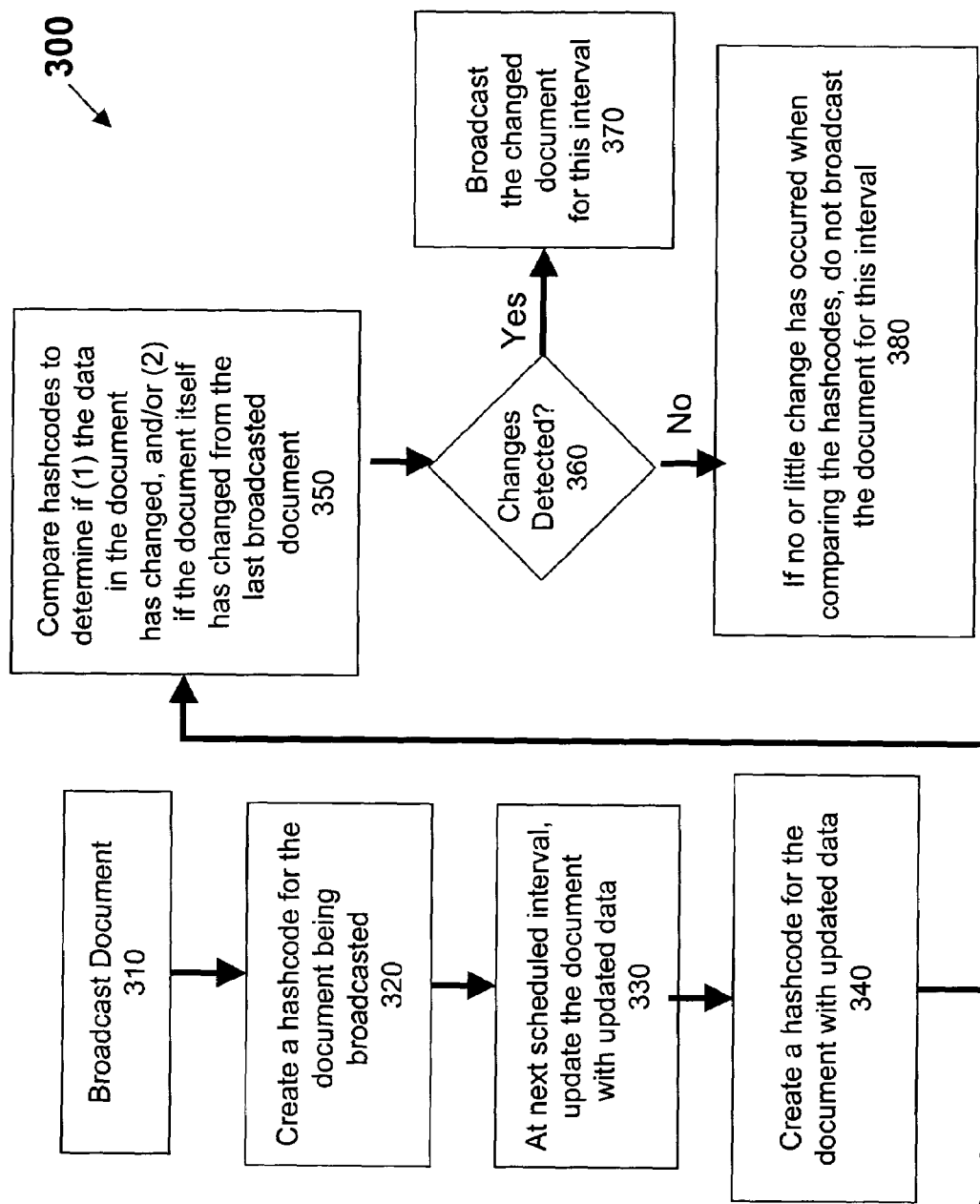
FIG. 3 is an exemplary flowchart for document distribution.

FIG. 3 shows an exemplary flow chart 300 for document distribution using hashcodes. If a document does not exist, a document is created for broadcasting (block 310). After the document is created but before the document is distributed, a hashcode is created and stored for the document (block 320) and/or a hashcode is created and stored for the data in the document. The document can then be broadcasted at the scheduled interval. At the next scheduled interval, the document can be updated with recent data (block 330). The data may be generated and stored in one or more data sources (not shown). Even though the document is updated with data, the data may not be new data in some cases—so the data is not additional or different data from the data in the previously-broadcasted version of the document. A hashcode is then created for the document with the updated data (block 340) and/or for the data itself.

The hashcodes of the previously-distributed document and the document with the updated data are compared (block 350). The comparison can be performed in hardware, such as a comparator device, or in software. If the data in the document has changed or if the document itself has changed from the last broadcasted document (block 350) then a change to the hashcodes has been detected (block 360). An example of a document change when the data in the document does not change can be a case where the document has a different template from a previously-distributed document, but the data remains the same. If the comparison of the hashcode indicates that the document and/or the data in the document has changed (block 360), the document with the updated data may be broadcasted for the current reporting interval (block 370). If the hashcode comparison indicates that the document has no changes, then the document may not be broadcasted for the current reporting interval (block 380).

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

The software (also known as programs, software tools or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on one or more computers each having a display device (e.g., a CRT (cathode ray tube) or LCD (liquid crystal display) monitor) for displaying information to the user and a keyboard and a pointing device (e.g., a mouse or a trackball) by which the user can provide input to the computer.

The systems and techniques described here can be implemented in a computing system that includes a backend component (e.g., as a data server), or that includes a middleware component (e.g., an application server), or that includes a front end component (e.g., a client computer having a graphical user interface, portal, or a Web browser through which a user can interact with an implementation of the systems and techniques described here), or any combination of such backend, middleware, or front end components. The components of the system can be interconnected by any form or medium of digital data communication (e.g., a communication network). Examples of communication networks include a local area network ("LAN"), a wide area network ("WAN"), a wireless local area network ("WLAN"), a personal area network ("PAN"), a mobile communication network using a multiple access technology (e.g., a cellular phone network with Code Division Multiple Access, "CDMA"), and the Internet.

The computing system can include clients and servers. A client and server are generally remote from each other and typically interact through a communication network. The relationship of client and server arises by virtue of computer programs running on the respective computers and having a client-server relationship to each other.

Although only a few implementations have been described in detail above, other modifications are possible. For example, the operations of the invention can be performed in a different order and still achieve desirable results. As one example, the process depicted in FIG. 3 does not require the particular order shown, or sequential order, to achieve desirable results (e.g., when changes are detected, a receiver may choose another option than the option shown).

Other implementations may be within the scope of the following claims.

What is claimed is:

1. A system for scheduled distribution of regularly-updated documents, comprising:
   a hashcode generator to generate a hashcode for a document, wherein the hashcode generator is configured to generate the hashcode for the document that is different from a hashcode for a previously-distributed document if the document includes an addition or change from the previously-distributed document;
   a comparator to compare the hashcode generated for the document with a hashcode for the previously-distributed document;
   one or more distribution channels configured to distribute the document;
   executable information comprising instructions to distribute the document over the one or more distribution channels if the comparator determines that the hashcode generated for the document and the hashcode for the previously-distributed document are different; and
   a broadcast engine to distribute the document to one or more receivers over the one or more distribution channels.

2. The system in accordance with claim 1, further comprising broadcast settings, wherein the broadcast settings comprise one or more user-defined settings for the one or more receivers.

3. The system in accordance with claim 2, wherein the user-defined settings comprise one or more variables to use in a template, wherein one of the variables include a page layout variable.

4. The system in accordance with claim 2, wherein the user-defined settings comprise one or more parameters to specify how a receiver prefers to receive the document, and wherein the one or more user settings comprise a type of data included in the document and a document template.

5. The system in accordance with claim 2, wherein the executable information comprises instructions to distribute the document to the one or more receivers if the hashcode for the previously-distributed document and the hashcode generated for the document are different.

6. The system in accordance with claim 2, wherein the executable information comprises instructions to not distribute the document to the one or more receivers if the hashcode for the previously-distributed document and the hashcode generated for the document are not different, and wherein the executable information further comprises instructions to send an alert to notify the one or more receivers if the hashcode for the previously-distributed document and the hashcode generated for the document are different.

7. A system for scheduled distribution of regularly-updated documents, comprising:
   a hashcode generator to generate a hashcode for document data, wherein the hashcode generator is configured to generate the hashcode for document data that is different from a hashcode for previously-distributed document data if the document data includes an addition or change from the previously-distributed document data;
   a comparator to compare the hashcode generated for the document data with the hashcode for the previously-distributed document data;
   One or more distribution channels configured to distribute the document;
   executable information comprising instructions to distribute the document over the one or more distribution channels if the comparator determines that the hashcode generated for the document data and the hashcode for the previously-distributed document data are different; and
   a broadcast engine to distribute the document data to one or more receivers over the one or more distribution channels.

8. A computer program product, stored on a machine-readable medium, the computer program product comprising instructions operable to cause data processing apparatus to:
   upload data in a document, wherein the document is adapted to be distributed at scheduled intervals;
   generate a hashcode for the document;
   distribute the document;
   at the next scheduled interval, update the document by uploading the document with updated data;
   generate a hashcode for the updated document;
   compare the hashcode for the document that was distributed with the hashcode for the updated document; and
   determine whether to distribute the updated document based on the comparison.

9. The product in accordance with claim 8, further comprising instructions to distribute the updated document to one or more receivers if the hashcode for the distributed document and the hashcode generated for the updated document are different.

10. The product in accordance with claim 8, further comprising instructions to not distribute the updated document to one or more receivers if the hashcode for the distributed document and the hashcode generated for the updated document are not different.

11. The product in accordance with claim 8, further comprising instructions to send an alert to notify one or more receivers if the hashcode for the distributed document and the hashcode generated for the updated document are different.

12. The product in accordance with claim 11, wherein the alert comprises a notice to the one or more receivers that the updated document is available for distribution.

13. The product in accordance with claim 8, wherein the hashcode for the distributed document and the hashcode generated for the updated document are uniquely defined.

14. The product in accordance with claim 8, further comprising instructions to receive input from a receiver of one or more specifications for any of the documents, wherein the one or more specifications comprise one or more document properties and a scheduled interval for receiving any of the documents.

15. The product in accordance with claim 8, further comprising instructions to create a document if a document does not exist.

16. Apparatus comprising a computer-readable storage medium tangibly embodying program instructions for distributing a document, the program instructions including instructions operable to cause a computer to:
define a hashcode for the document, wherein the hashcode for the document is uniquely defined;
distribute the document over one or more distribution channels;
update the document with new data at a later scheduled interval;
define a hashcode for the updated document, wherein the hashcode for the updated document is uniquely defined;
compare the hashcode for the updated document and the hashcode with the distributed document to determine if the hashcodes differ; and
if the hashcodes differ, determine that the updated document and the distributed document are different.

17. The apparatus in accordance with claim 16, further comprising instructions to:
store the hashcode for the updated document and the hashcode of the distributed document.

18. The apparatus in accordance with claim 17, wherein the distribution of the document comprises any of an email, an alert, and a fax.

19. The apparatus in accordance with claim 16, wherein the hashcodes differ because the data in the distributed document and the new data in the updated document are different.

20. The apparatus in accordance with claim 16, wherein the hashcodes differ because a template for the distributed document and a template for the updated document are different.

21. A computer program product, stored on a machine-readable medium, the computer program product comprising instructions operable to cause data processing apparatus to:
upload data in a document, wherein the document is adapted to be distributed at scheduled intervals;
generate a hashcode for the data;
distribute the document;
at the next scheduled interval, update the document by uploading the document with updated data;
generate a hashcode for the updated data;
compare the hashcode for the data with the hashcode for the updated data; and
determine whether to distribute the updated document based on the comparison.

22. The product in accordance with claim 21, further comprising instructions to distribute the updated document to one or more receivers if the hashcode for the data and the hashcode for the updated data are different.

23. The product in accordance with claim 21, further comprising instructions to not distribute the updated document to one or more receivers if the hashcode for the data and the hashcode for the updated data are not different.

24. The product in accordance with claim 21, further comprising instructions to send an alert to notify one or more receivers if the hashcode for the data and the hashcode for the updated data are different.

25. The product in accordance with claim 24, wherein the alert comprises a notice to the one or more receivers that the updated document is available for distribution.

* * * * *

UNITED STATES PATENT AND TRADEMARK OFFICE
CERTIFICATE OF CORRECTION

PATENT NO. : 7,580,993 B2  Page 1 of 1
APPLICATION NO. : 10/902997
DATED : August 25, 2009
INVENTOR(S) : Uwe Schwerk It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1393 days.

Signed and Sealed this

Fourteenth Day of September, 2010

David J. Kappos
*Director of the United States Patent and Trademark Office*